United States Patent
Messerges et al.

(10) Patent No.: US 10,979,232 B2
(45) Date of Patent: Apr. 13, 2021

(54) METHOD FOR PROVISIONING DEVICE CERTIFICATES FOR ELECTRONIC PROCESSORS IN UNTRUSTED ENVIRONMENTS

(71) Applicant: MOTOROLA SOLUTIONS, INC., Chicago, IL (US)

(72) Inventors: Thomas S. Messerges, Schaumburg, IL (US); Brian W. Pruss, Streamwood, IL (US); Kenneth C. Fuchs, Winfield, IL (US); Adam C. Lewis, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 208 days.

(21) Appl. No.: 15/994,811

(22) Filed: May 31, 2018

(65) Prior Publication Data
US 2019/0372780 A1 Dec. 5, 2019

(51) Int. Cl.
*H04L 9/32* (2006.01)
*G06F 21/44* (2013.01)
*H04L 29/06* (2006.01)

(52) U.S. Cl.
CPC ............ *H04L 9/3263* (2013.01); *G06F 21/44* (2013.01); *H04L 9/321* (2013.01); *H04L 9/3247* (2013.01); *H04L 63/12* (2013.01)

(58) Field of Classification Search
None
See application file for complete search history.

(56) References Cited

U.S. PATENT DOCUMENTS

| | | | | |
|---|---|---|---|---|
| 5,832,089 A * | 11/1998 | Kravitz | ................. | G06Q 20/02 705/69 |
| 5,867,578 A * | 2/1999 | Brickell | ................. | G06F 21/40 713/180 |
| 6,704,871 B1 * | 3/2004 | Kaplan | .................. | G06F 21/72 713/192 |
| 6,708,273 B1 * | 3/2004 | Ober | ........................ | G06F 8/60 713/189 |
| 7,493,484 B2 * | 2/2009 | Lee | .......................... | G06F 8/66 713/2 |
| 8,316,229 B2 * | 11/2012 | Wan | .................... | H04L 41/0806 713/156 |

(Continued)

OTHER PUBLICATIONS

International Search Report and Written Opinion dated Sep. 4, 2019 for corresponding International Application No. PCT/US2019/032517 (13 pages).

*Primary Examiner* — Michael R Vaughan
(74) *Attorney, Agent, or Firm* — Michael Best and Friedrich, LLP

(57) ABSTRACT

Provisioning device certificates for electronic processors. One example method includes receiving a flashloader at the electronic processor. The method also includes validating the flashloader with the electronic processor. After validating the flashloader, the method includes receiving an encrypted provisioned key bundle at the electronic processor. The method also includes decrypting the encrypted provisioned key bundle with the electronic processor using a provisioning key to create a decrypted provisioned key bundle. The method further includes executing a provisioning process on the electronic processor using the decrypted provisioned key bundle.

12 Claims, 5 Drawing Sheets

(56) References Cited

U.S. PATENT DOCUMENTS

| | | | | |
|---|---|---|---|---|
| 8,943,323 | B2* | 1/2015 | Brown | H04L 9/3226 713/175 |
| 9,100,174 | B2* | 8/2015 | Hartley | H04L 9/0866 |
| 9,147,086 | B1* | 9/2015 | Potlapally | G06F 21/64 |
| 9,171,162 | B2* | 10/2015 | Malkhasyan | G06F 21/57 |
| 9,258,295 | B1* | 2/2016 | Nedeltchev | H04L 63/0823 |
| 9,590,806 | B2 | 3/2017 | Huang et al. | |
| 9,628,875 | B1* | 4/2017 | Roth | H04Q 5/22 |
| 9,742,563 | B2* | 8/2017 | Gotze | H04L 9/0866 |
| 10,003,467 | B1* | 6/2018 | Miller | H04L 9/0891 |
| 2004/0078119 | A1* | 4/2004 | Luitje | G06F 8/60 701/1 |
| 2005/0079868 | A1* | 4/2005 | Shankar | H04L 63/0823 455/435.1 |
| 2005/0102584 | A1* | 5/2005 | Paturi | G06F 8/654 714/47.3 |
| 2005/0144437 | A1* | 6/2005 | Ransom | G06F 1/28 713/151 |
| 2005/0228980 | A1* | 10/2005 | Brokish | G06F 21/575 713/2 |
| 2005/0268092 | A1* | 12/2005 | Shankar | G06F 21/575 713/164 |
| 2006/0095454 | A1* | 5/2006 | Shankar | G06F 21/602 |
| 2006/0117181 | A1* | 6/2006 | Brickell | H04L 9/0844 713/176 |
| 2006/0218649 | A1* | 9/2006 | Brickell | G06F 21/572 726/27 |
| 2007/0112773 | A1* | 5/2007 | Joyce | G06F 8/64 |
| 2008/0189695 | A1* | 8/2008 | Andersson | H04L 9/0891 717/168 |
| 2009/0077618 | A1* | 3/2009 | Pearce | H04L 63/0892 726/1 |
| 2009/0138754 | A1* | 5/2009 | Edwards | G06F 9/4403 714/6.11 |
| 2009/0285390 | A1* | 11/2009 | Scherer | G06F 21/51 380/44 |
| 2010/0257345 | A1* | 10/2010 | Tazzari | G06F 8/654 713/1 |
| 2011/0047373 | A1* | 2/2011 | Karasawa | H04L 9/3247 713/156 |
| 2011/0161659 | A1* | 6/2011 | Himawan | G06F 21/33 713/156 |
| 2012/0023334 | A1* | 1/2012 | Brickell | H04L 9/0844 713/169 |
| 2012/0099630 | A1* | 4/2012 | Verhelst | H04B 17/16 375/224 |
| 2012/0137137 | A1* | 5/2012 | Brickell | G06F 21/73 713/182 |
| 2012/0173873 | A1* | 7/2012 | Bell | H04L 9/321 713/156 |
| 2012/0198224 | A1* | 8/2012 | Leclercq | H04L 9/083 713/2 |
| 2012/0254624 | A1* | 10/2012 | Malkhasyan | G06F 21/572 713/189 |
| 2012/0260330 | A1* | 10/2012 | Zlatarev | H04L 9/3263 726/10 |
| 2013/0080764 | A1* | 3/2013 | Khosravi | H04L 9/0822 713/150 |
| 2013/0080771 | A1* | 3/2013 | Brickell | H04L 9/0833 713/158 |
| 2013/0124840 | A1* | 5/2013 | Diluoffo | G06F 21/575 713/2 |
| 2013/0339734 | A1* | 12/2013 | Vernia | H04L 63/0428 713/168 |
| 2014/0108786 | A1* | 4/2014 | Kreft | G06F 21/71 713/156 |
| 2014/0250290 | A1* | 9/2014 | Stahl | G06F 9/4401 713/2 |
| 2014/0310509 | A1* | 10/2014 | Potlapally | G06F 11/1417 713/2 |
| 2014/0310510 | A1* | 10/2014 | Potlapally | G06F 9/4401 713/2 |
| 2015/0154031 | A1* | 6/2015 | Lewis | G06F 9/4406 713/2 |
| 2015/0248296 | A1* | 9/2015 | Zhang | G06F 9/4401 713/2 |
| 2015/0326540 | A1* | 11/2015 | Hamburg | H04L 63/0853 713/168 |
| 2016/0012233 | A1* | 1/2016 | Kawano | G06F 21/575 713/165 |
| 2016/0034693 | A1* | 2/2016 | Takeuchi | G06F 21/602 713/189 |
| 2016/0063254 | A1* | 3/2016 | Jeansonne | G06F 21/606 713/2 |
| 2016/0277446 | A1* | 9/2016 | Kumar | H04L 63/20 |
| 2016/0352514 | A1* | 12/2016 | Huang | H04L 9/0822 |
| 2017/0277898 | A1* | 9/2017 | Powell | G06F 21/602 |
| 2017/0293484 | A1* | 10/2017 | Haase | G06F 8/658 |
| 2018/0004444 | A1* | 1/2018 | Murray | G06F 3/0629 |
| 2018/0004953 | A1* | 1/2018 | Smith, II | H04L 9/0897 |
| 2018/0007040 | A1* | 1/2018 | Thom | G06F 21/575 |
| 2018/0034682 | A1* | 2/2018 | Gulati | H04L 9/3268 |
| 2018/0039795 | A1* | 2/2018 | Gulati | G06F 21/64 |
| 2018/0041341 | A1* | 2/2018 | Gulati | H04L 9/30 |
| 2018/0097639 | A1* | 4/2018 | Gulati | G06F 8/61 |
| 2018/0131677 | A1* | 5/2018 | Brickell | H04L 63/0876 |
| 2018/0145991 | A1* | 5/2018 | McCauley | H04L 63/0428 |
| 2018/0189493 | A1* | 7/2018 | Schilder | G06F 21/73 |
| 2019/0073478 | A1* | 3/2019 | Khessib | G06F 9/4401 |
| 2019/0074982 | A1* | 3/2019 | Hughes | H04L 9/3268 |
| 2019/0087577 | A1* | 3/2019 | Doliwa | H04W 4/70 |
| 2019/0129493 | A1* | 5/2019 | Li | G06F 1/3246 |
| 2019/0278913 | A1* | 9/2019 | Ndu | G06F 21/51 |
| 2019/0311123 | A1* | 10/2019 | Lal | G06F 9/45558 |
| 2019/0356529 | A1* | 11/2019 | Gulati | G09C 1/00 |
| 2019/0370470 | A1* | 12/2019 | Yao | G06F 21/577 |

\* cited by examiner

METHOD FOR PROVISIONING DEVICE CERTIFICATES FOR ELECTRONIC PROCESSORS IN UNTRUSTED ENVIRONMENTS

BACKGROUND OF THE INVENTION

Device certificates are commonly used to authenticate electronic devices. Device certificates need to be signed by a trusted certificate authority. However, signing device certificates in untrusted manufacturing environments poses some challenges.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
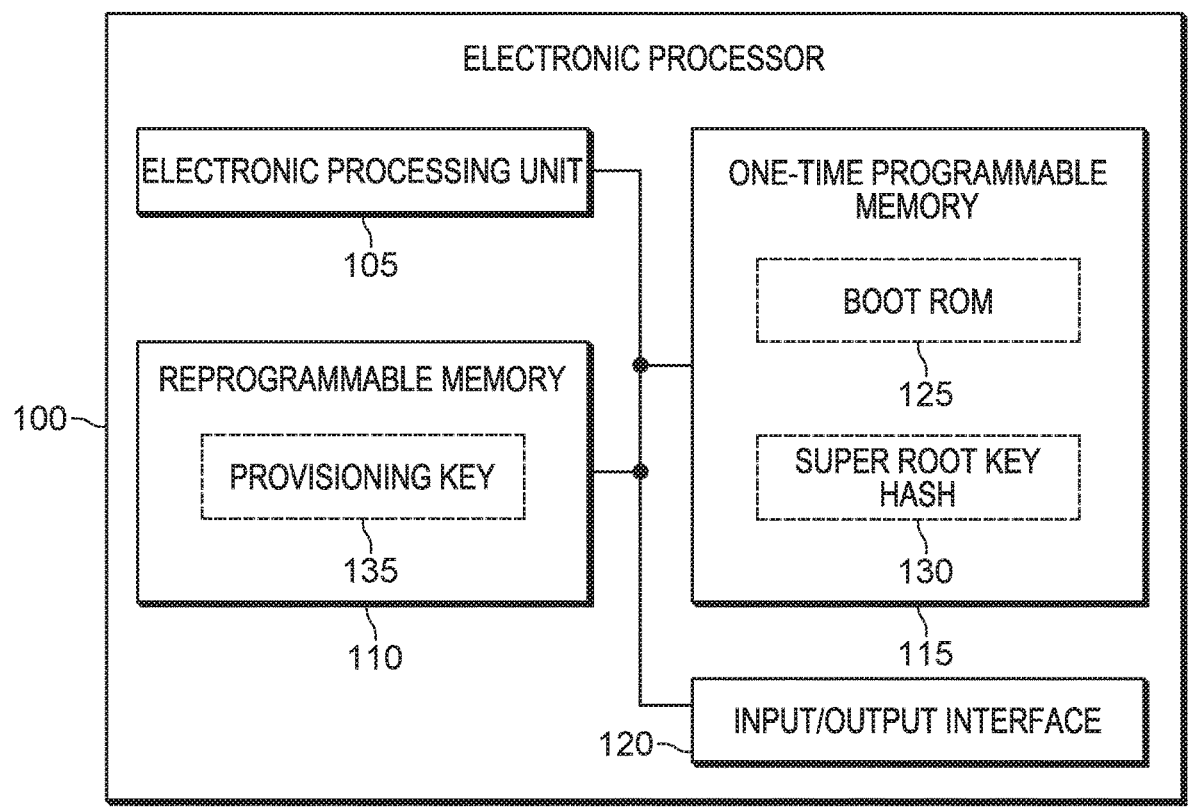
FIG. 1 is a diagram of an electronic processor, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Device certificates are commonly used to authenticate electronic devices. As noted, device certificates need to be signed by a trusted certificate authority. Many electronic devices are manufactured by third-party manufacturers and it is difficult to guarantee that these untrusted manufacturers will correctly provision the electronic processor included in the electronic devices. Thus, it is desirable to ensure secure provisioning of device certificates for electronic processors in an untrusted environment.

One approach to securely provision device certificates for electronic processors is to use a trusted third-party manufacturer. However, even manufacturing in a factory of a trusted third-party manufacturer may still result in improper or unsecure device provisioning. In addition, manufacturing by trusted third-party manufacturers is expensive.

Another approach to securely provision device certificates for electronic processors in an untrusted environment is to have a certificate authority located in the untrusted third-party environment. For example, a trusted server can be kept in an untrusted factory to act at a certificate authority. However, keeping a trusted server in an untrusted factory is a security risk. Thus, instead of attempting to add trust to untrusted environment, it is desirable to leverage secure factory programming techniques to provision device certificates.

Among other things, embodiments presented herein provision a device certificate for an electronic processor by leveraging secure factory programming techniques. Using such embodiments, an electronic processor can be securely provisioned in an untrusted environment.

One example embodiment provides a method for provisioning a device certificate for an electronic processor. The method includes receiving a flashloader at the electronic processor. The method also includes validating the flashloader with the electronic processor. After validating the flashloader, the method includes receiving an encrypted provisioned key bundle at the electronic processor. The method also includes decrypting the encrypted provisioned key bundle with the electronic processor using a provisioning key to create a decrypted provisioned key bundle. The method further includes executing a provisioning process on the electronic processor using the decrypted provisioned key bundle.

Another example embodiment provides a method for provisioning a device certificate for an electronic processor. The method includes receiving a flashloader at the electronic processor. The method also includes validating the flashloader with the electronic processor. After validating the flashloader, the method includes receiving a double encrypted provisioned key bundle at the electronic processor. The method also includes retrieving a common encryption key stored in a one-time programmable memory included in the electronic processor. The method further includes decrypting the double encrypted provisioned key bundle with the electronic processor using the common encryption key and a provisioning key to create a decrypted provisioned key bundle. The method also includes executing a provisioning process on the electronic processor using the decrypted provisioned key bundle.

Yet another example embodiment provides a method for provisioning a device certificate for an electronic processor. The method includes receiving a flashloader at the electronic processor. The method also includes validating the flashloader with the electronic processor. After validating the flashloader, the method includes receiving an encrypted provisioned key bundle at the electronic processor. The method also includes retrieving a common encryption key stored in a one-time programmable memory included in the electronic processor. The method further includes decrypting the encrypted provisioned key bundle with the electronic processor using the common encryption key to create a decrypted provisioned key bundle. The method also includes executing a provisioning process on the electronic processor using the decrypted provisioned key bundle.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example electronic processor 100. In the embodiment illustrated, the electronic processor 100 includes an electronic processing unit 105, a reprogrammable memory 110, a one-time programmable memory 115, and an input/output interface 120. The illustrated components, along with other various modules and components are coupled to each other by or through one or more electrical connections (for example, control or data buses) that enable communication therebetween. The use of such connections, including control and data buses, for the interconnection between and exchange of information among the various modules and components would be apparent to a person skilled in the art. In some embodiments, the electronic processor 100 includes fewer or additional components in configurations different from that illustrated in FIG. 1. For example, in some embodiments, the electronic processor 100 includes multiple electronic processing units.

The electronic processing unit 105 obtains and provides information (for example, from the reprogrammable memory 110, the one-time programmable memory 115, the input/output interface 120, or a combination thereof), and processes the information by executing one or more software instructions or modules, capable of being stored, for example, in a random access memory (RAM) area of the reprogrammable memory 110 or a read only memory (ROM) of the one-time programmable memory 115 or another non-transitory computer readable medium (not shown). The software can include firmware, one or more applications, program data, filters, rules, one or more program modules, and other executable instructions. The electronic processing unit 105 is configured to retrieve from the reprogrammable memory 110 and execute, among other things, software related to the control processes and methods described herein. The reprogrammable memory 110 can include one or more non-transitory computer-readable media, and includes a program storage area and a data storage area. The program storage area and the data storage area can include combinations of different types of memory, as described herein.

The one-time programmable memory 115 can include one or more non-transitory computer-readable media, and can include combinations of different types of memory, as described herein. In some embodiments, the one-time programmable memory 115 includes fuses, antifuses, or both. The one-time programmable memory 115 can include digital memory where the setting of each bit is locked by a fuse or an antifuse.

The input/output interface 120 is configured to receive input and to provide system output. The input/output interface 120 obtains information and signals from, and provides information and signals to, (for example, over one or more wired and/or wireless connections) devices both internal and external to the electronic processor 100.

In producing an electronic product (or electronic device), an original equipment manufacturer (OEM) may design a product that includes the electronic processor 100. The electronic processor 100 itself may be manufactured by a chip manufacturer. Ultimately, the electronic product (including the electronic processor 100) may be manufactured by a third-party manufacturer (referred to herein as a "product manufacturer").

In order to enable provisioning of the electronic processor 100 and perform other tasks, the chip manufacturer may develop a Boot ROM 125. The Boot ROM 125 includes the very first instructions (or code) which is executed by the electronic processing unit 105 at power-on or reset. In some embodiments, the Boot ROM 125 may be stored in the one-time programmable memory 115 (for example, in a mask ROM or a write-protected Flash memory). In some embodiments, prior to executing any other code, the instructions included in the Boot ROM 125 cause the electronic processing unit 105 to check whether the other code has a valid signature using information fused into the electronic processor 100 to ensure that only valid code is executed (that is, high-assurance booting). In some embodiments, the information fused into the electronic processor 100 includes a super root key hash (SRKH) 130 which is stored in the one-time programmable memory 115 by the chip manufacturer. For example, the super root key hash 130 may be burned into a set of fuses. The super root key hash 130 is a value derived in part from a super root key (SRK). Both the super root key hash 130 and super root key may be set by the original equipment manufacturer. In some embodiments, the super root key is a key pair including a private root key and a public root key.

In some embodiments, the Boot ROM 125 also includes executable instructions that cause the electronic processing unit 105 to derive a provisioning key 135 using the super root key hash 130. The provisioning key 135 is utilized with the provisioning solutions described herein as will be described in more detail later. In some embodiments, the provisioning key 135 is a key pair including a private provisioning key and a public provisioning key. The electronic processing unit 105 stores the provisioning key 135 in secure storage on the electronic processor 100 (for example, in a protected register included in some embodiments). The provisioning key 135 is inaccessible outside of the electronic processor 100.

In general, provisioning of the electronic processor 100 can occur in a factory of the product manufacturer (that is, factory provisioning) and in a facility of the customer (that is, field provisioning). As will be described in more detail below, the components needed to provision the electronic processor 100 at a factory of the product manufacturer and at a facility of the customer are created by the original equipment manufacturer and are packaged for secure delivery to the product manufacturer and the customer in secure images.

Figure 2:
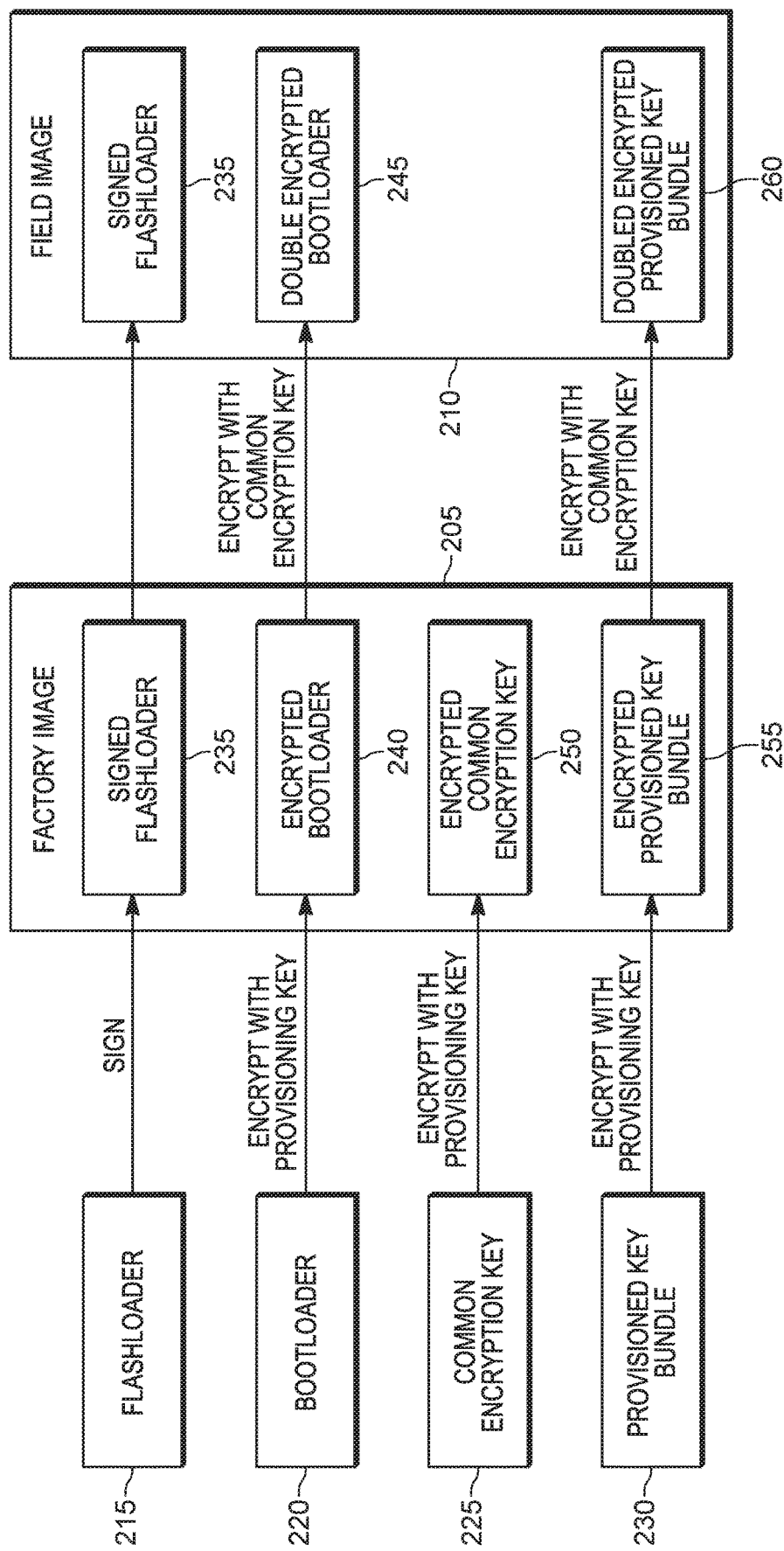
FIG. 2 is a diagram of a factory image and a field image, in accordance with some embodiments.

FIG. 2 is a diagram illustrating the creation of an example factory image 205 and an example field image 210. The factory image 205 includes, among other things, components for provisioning the electronic processor 100 at a factory of the product manufacturer. The field image 210 includes, among other things, components for provisioning the electronic processor 100 at a facility of the customer. In some embodiments, the components needed to provision the electronic processor 100 include a flashloader 215, a bootloader 220, a common encryption key 225, and a provisioned key bundle 230.

The flashloader 215 includes executable instructions that cause the electronic processing unit 105 to invoke and control the process of provisioning a device certificate for the electronic processor 100 as will be described in more detail later. In some embodiments, the flashloader 215 is stored in a random access memory (RAM) area of the reprogrammable memory 110 during the provisioning process. In the embodiment illustrated in FIG. 2, the flashloader 215 is signed (for example, with a signing key) to create a signed flashloader 235. In some embodiments, the super root key hash 130, the root key, or both are derived based at least in part on the signing key. In alternate embodiments, the signing key includes a private key that corresponds to a private/public root key pair. In the embodiment illustrated in FIG. 2, the factory image 205 and the field image 210 both include the signed flashloader 235. In alternate embodiments, the factory image 205, the field image 210, or both may include the flashloader 215 (that is, an unsigned flashloader). In other embodiments, the flashloader 215, the bootloader 220, and the provisioned key bundle 230 may be different between the factory image 205 and the field image 210.

The bootloader 220 includes executable instructions that cause the electronic processing unit 105 to load an operating system, applications, or firmware that is executed by the electronic processor 100 during normal operations of the electronic product within which the electronic processor 100 is incorporated. The bootloader 220 is encrypted with the provisioning key 135 to create an encrypted bootloader 240, which is included in the illustrated embodiment of the factory image 205. In some embodiments, the bootloader 220 is signed (for example, with a signing key) prior to being encrypted with the provisioning key 135. In the embodiment illustrated in FIG. 2, the encrypted bootloader 240 is further encrypted with the common encryption key 225 to generate a double encrypted bootloader 245, which is, in example illustrated, included in the field image 210. In alternate embodiments, the field image 210 includes a copy of the bootloader 220 that is only encrypted with the common encryption key 225 (i.e., single encrypted).

As will be described in more detail later, the common encryption key 225 is stored in the one-time programmable memory 115 during provisioning of the electronic processor 100. The common encryption key 225 is encrypted with the provisioning key 135 to create an encrypted common encryption key 250, which is included in the illustrated embodiment of the factory image 205. In some embodiments, the common encryption key 225 is signed (for example, with a signing key) prior to being encrypted with the provisioning key 135. In alternate embodiments, the common encryption key 225 is signed after being encrypted with the provisioning key 135 (for example, the encrypted common encryption key 250 is signed).

In some embodiments, the provisioned key bundle 230 includes certificate authority keys, keys for signing certificate signing requests, PKCS #12 packages, signed device certificates, private device keys, or a combination thereof. The provisioned key bundle 230 is encrypted with the provisioning key 135 to create an encrypted provisioned key bundle 255, which is included in the illustrated embodiment of the factory image 205. In some embodiments, the provisioned key bundle 230 is signed (for example, with a signing key) prior to being encrypted with the provisioning key 135. In the embodiment illustrated in FIG. 2, the encrypted provisioned key bundle 255 is further encrypted with the common encryption key 225 to create a double encrypted provisioned key bundle 260, which is included in the illustrated embodiment of the field image 210. In alternate embodiments, the field image 210 includes a copy of the provisioned key bundle 230 that is only encrypted with the common encryption key 225. In the embodiment illustrated in FIG. 2, the factory image 205 and the field image 210 each include only one provisioned key bundle. In alternate embodiments, the factory image 205 and/or the field image 210 may include more than one provisioned key bundle.

Figure 3:
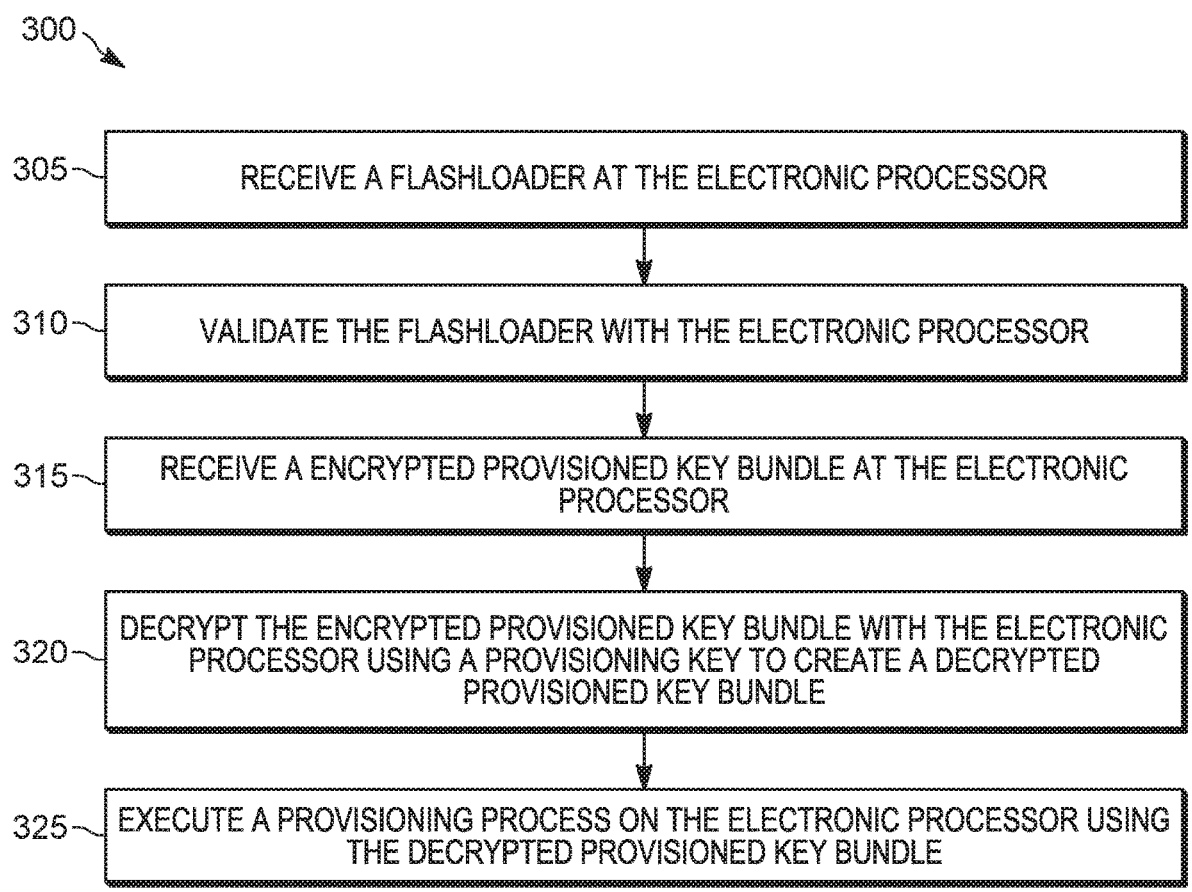
FIG. 3 is a flowchart of a method for factory provisioning a device certificate for an electronic processor, in accordance with some embodiments.

As noted herein, the electronic processor 100 may be provisioned at a factory of the product manufacturer (that is, factory provisioning). FIG. 3 illustrates an example method 300 for factory provisioning a device certificate for the electronic processor 100. The method 300 is described with respect to FIGS. 1 and 2. The method 300 is described as being performed by the electronic processor 100 and, in particular, the electronic processing unit 105. However, it should be understood that in some embodiments, portions of the method 300 may be performed by other devices, including for example, an external electronic processing unit located outside of the electronic processor 100.

At block 305, the electronic processor 100 receives the flashloader 215. For example, the electronic processor 100 receives the flashloader 215 via the input/output interface 120 and stores the flashloader 215 in the reprogrammable memory 110.

As block 310, the electronic processor 100 validates the flashloader 215. For example, in some embodiments, the electronic processing unit 105 receives the signed flashloader 235 and validates the signed flashloader 235 by checking the signature. In some embodiments, the method 300 ends when the flashloader 215 cannot be validated.

Response to successfully validating the flashloader 215, the electronic processor 100 receives the encrypted provisioned key bundle 255 at block 315. For example, the electronic processor 100 receives the encrypted provisioned key bundle 255 via the input/output interface 120 and stores the encrypted provisioned key bundle 255 in the reprogrammable memory 110.

As described herein, the provisioned key bundle 230 is encrypted by the original equipment manufacturer with the provisioning key 135 to create the encrypted provisioned key bundle 255. Also, as described herein, the Boot ROM 125 includes instructions that cause the electronic processing unit 105 to create the provisioning key 135 based at least in part on the super root key hash 130. Thus, at block 320, the electronic processor 100 decrypts the encrypted provisioned key bundle 255 using the provisioning key 135 to create a decrypted provisioned key bundle (that is, the provisioned key bundle 230).

In some embodiments, the provisioning key 135 is a key pair including a private provisioning key and a public provisioning key. In such embodiments, any item described herein as being encrypted with the provisioning key 135 may be encrypted using the public provisioning key to create an encrypted item, and any encrypted item may be decrypted using the private provisioning key to create an unencrypted item. For example, the provisioned key bundle 230 may be encrypted with the public provisioning key to create the encrypted provisioned key bundle 255. The encrypted provisioned key bundle 255 may be decrypted using the private provisioning key to create the decrypted provisioning key (that is, the provisioned key bundle 230).

Returning to FIG. 3, at block 325, the electronic processor 100 executes a provisioning process using the decrypted provisioned key bundle. In some embodiments, the electronic processing unit 105 retrieves a certificate authority key from the decrypted provisioned key bundle, generates an unsigned device certificate, and signs the unsigned device certificate with the certificate authority key to create a signed device certificate. In some embodiments, the electronic processing unit 105 erases the encrypted provisioned key bundle 255 and the certificate authority key from the electronic processor 100 after signing the unsigned device certificate with the certificate authority key. Alternatively or in addition, the electronic processing unit 105 extracts a signed device certificate from the decrypted provisioned key bundle. For example, the electronic processing unit 105 may retrieve a PKCS #12 bundle included in the decrypted provisioned key bundle and extract a signed device certificate included in the PKCS #12 bundle. Alternatively or in addition, the electronic processing unit 105 retrieves a key (for example, a first key) from the decrypted provisioned key bundle, generates an unsigned certificate signing request (CSR) for an unsigned device certificate, signs the unsigned certificate signing request using the first key to create a signed certificate signing request, and sends the signed certificate signing request to an external server (not shown). After receiving the signed certificate signing request, the external server sends a signed device certificate to the electronic processor 100. In some embodiments, the provisioning process includes the electronic processing unit 105 creating a device key for the electronic processor 100 (for example, a symmetric device key). In alternate embodiments, the provisioning process includes the electronic processing unit 105 creating a device key pair for the electronic processor 100 (that is, a private device key and a public device key).

In some embodiments, after validating the flashloader 215 at block 310, the electronic processor 100 receives the encrypted common encryption key 250, decrypts the encrypted common encryption key 250 using the provisioning key 135 to create a decrypted common encryption key (that is, the common encryption key 225), and stores the decrypted common encryption key in the one-time programmable memory 115. For example, the electronic processor 100 writes (or burns) the decrypted common encryption key into a plurality of fuses (or anti-fuses) included in the one-time programmable memory 115.

In some embodiments, after validating the flashloader 215 at block 310, the electronic processor 100 receives the encrypted bootloader 240, decrypts the encrypted bootloader 240 using the provisioning key 135 to create a decrypted bootloader (that is, the bootloader 220), and stores the decrypted bootloader in the reprogrammable memory 110. Alternatively or in addition, after validating the flashloader 215 at block 310, the electronic processor 100 receives the double encrypted bootloader 245, decrypts the double encrypted bootloader 245 using the provisioning key 135 and the common encryption key 225 to create a decrypted bootloader (that is, the bootloader 220), and stores the decrypted bootloader in the reprogrammable memory 110. Alternatively or in addition, after validating the flashloader 215 at block 310, the electronic processor 100 receives the encrypted bootloader 240, decrypts the encrypted bootloader 240 using the common encryption key 225 to create a decrypted bootloader (that is, the bootloader 220), and stores the decrypted bootloader in the reprogrammable memory 110.

Figure 4:
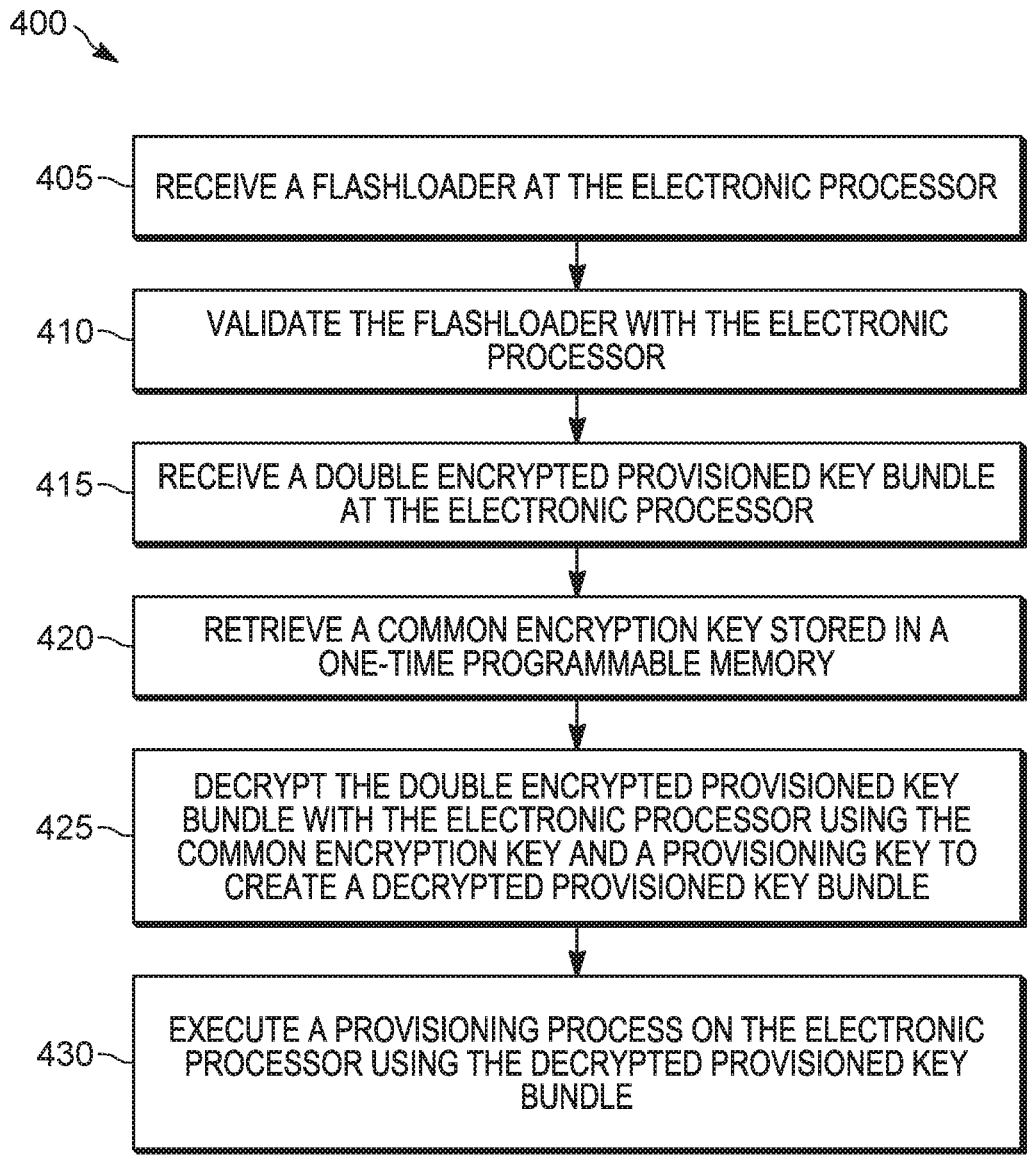
FIG. 4 is a flowchart of a method for field provisioning a device certificate for an electronic processor, in accordance with some embodiments.

As noted herein, the electronic processor 100 may be provisioned at a facility of the customer (that is, field provisioning). FIG. 4 illustrates an example method 400 for field provisioning a device certificate for the electronic processor 100. The method 400 is described with respect to FIGS. 1 and 2. The method 400 is described as being performed by the electronic processor 100 and, in particular, the electronic processing unit 105. However, it should be understood that in some embodiments, portions of the method 400 may be performed by other devices, including for example, an external electronic processing unit located outside of the electronic processor 100.

At block 405, the electronic processing unit 105 receives the flashloader 215. For example, the electronic processor 100 receives the flashloader 215 via the input/output interface 120 and stores the flashloader 215 in the reprogrammable memory 110.

As block 410, the electronic processor 100 validates the flashloader 215. For example, in some embodiments, the electronic processing unit 105 receives the signed flashloader 235 and validates the signed flashloader 235 by checking the signature. In some embodiments, the method 400 ends when the flashloader 215 cannot be validated.

Response to successfully validating the flashloader 215, the electronic processor 100 receives the double encrypted provisioned key bundle 260 at block 415. For example, the electronic processor 100 receives the double encrypted provisioned key bundle 260 via the input/output interface 120 and stores the double encrypted provisioned key bundle 260 in the reprogrammable memory 110.

At block 420, the electronic processor 100 retrieves the common encryption key 225 stored in the one-time programmable memory 115. For example, the electronic processing unit 105 reads the values burned into a set of fuses that indicate the common encryption key 225.

As described herein, the double encrypted provisioned key bundle 260 is double encrypted by the original equipment manufacturer with the provisioning key 135 and the common encryption key 225 to create the double encrypted provisioned key bundle 260. Also, as described herein, the Boot ROM 125 includes instructions that cause the electronic processing unit 105 to create the provisioning key 135 based at least in part on the super root key hash 130. Thus, at block 425, the electronic processor 100 decrypts the double encrypted provisioned key bundle 260 using the provisioning key 135 to create a decrypted provisioned key bundle (that is, the provisioned key bundle 230).

At block 430, the electronic processor 100 executes a provisioning process using the decrypted provisioned key bundle. The provisioning process can include, for example, one (or a combination) of the provisioning processes described above in relation to block 325 in FIG. 3.

In some embodiments, after validating the flashloader 215 at block 410, the electronic processor 100 receives the double encrypted bootloader 245, decrypts the double encrypted bootloader 245 using the provisioning key 135 and the common encryption key 225 to create a decrypted bootloader (that is, the bootloader 220), and stores the decrypted bootloader in the reprogrammable memory 110. Alternatively or in addition, after validating the flashloader 215 at block 410, the electronic processor 100 receives the encrypted bootloader 240, decrypts the encrypted bootloader 240 using the common encryption key 225 to create a decrypted bootloader (that is, the bootloader 220), and stores the decrypted bootloader in the reprogrammable memory 110.

Figure 5:
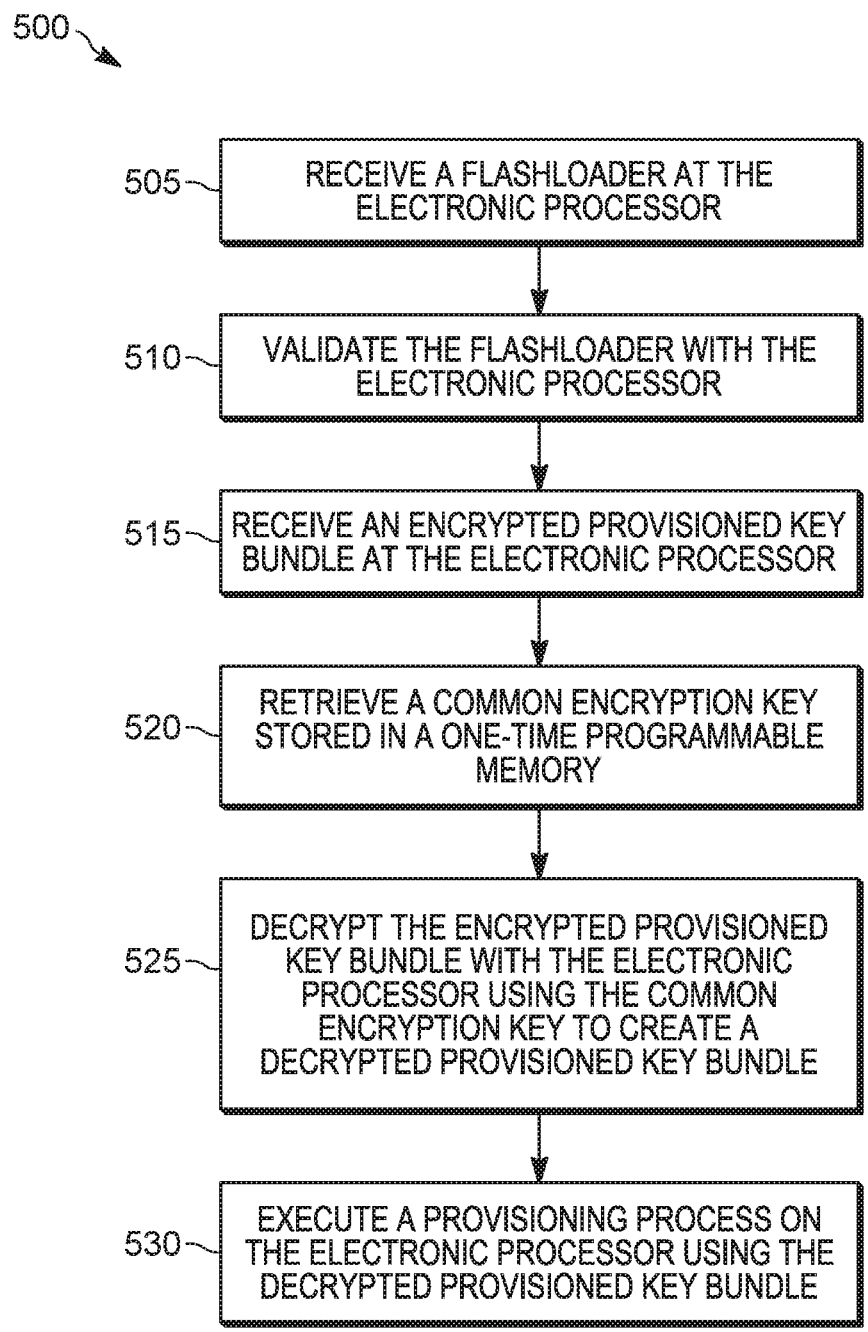
FIG. 5 is a flowchart of a method for field provisioning a device certificate for an electronic processor, in accordance with some embodiments.

As noted herein, in some embodiments, the field image 210 includes a copy of the provisioned key bundle 230 that is only encrypted with the common encryption key 225. FIG. 5 illustrates an example method 500 for field provisioning a device certificate for the electronic processor 100 when the provisioned key bundle 230 is only encrypted with the common encryption key 225. The method 500 is described with respect to FIGS. 1 and 2. The method 500 is described as being performed by the electronic processor 100 and, in particular, the electronic processing unit 105. However, it should be understood that in some embodiments, portions of the method 500 may be performed by other devices, including for example, an external electronic processing unit located outside of the electronic processor 100.

At block 505, the electronic processing unit 105 receives the flashloader 215. For example, the electronic processor 100 receives the flashloader 215 via the input/output interface 120 and stores the flashloader 215 in the reprogrammable memory 110.

As block 510, the electronic processor 100 validates the flashloader 215. For example, in some embodiments, the electronic processing unit 105 receives the signed flashloader 235 and validates the signed flashloader 235 by checking the signature. In some embodiments, the method 500 ends when the flashloader 215 cannot be validated.

Response to successfully validating the flashloader 215, the electronic processor 100 receives the encrypted provisioned key bundle 255 at block 515. For example, the electronic processor 100 receives the encrypted provisioned key bundle 255 via the input/output interface 120 and stores the encrypted provisioned key bundle 255 in the reprogrammable memory 110.

At block 520, the electronic processor 100 retrieves the common encryption key 225 stored in the one-time programmable memory 115. For example, the electronic processing unit 105 reads the values burned into a set of fuses that indicate the common encryption key 225.

At block 525, the electronic processor 100 decrypts the encrypted provisioned key bundle 255 using the common encryption key 225 to create a decrypted provisioned key bundle (that is, the provisioned key bundle 230).

At block 530, the electronic processor 100 executes a provisioning process using the decrypted provisioned key bundle. The provisioning process can include, for example, one (or a combination) of the provisioning processes described above in relation to block 325 in FIG. 3.

After executing the provisioning process as described herein, the electronic processor 100 can be authenticated using the signed device certificate. For example, an external host device can authenticate the electronic processor 100 by verifying the signature included in the signed device certificate. As a further example, the electronic processor 100 can use the signed device certificate to correctly respond to a challenge message sent by an external host device.

After the provisioning process is complete and the electronic processor 100 is subsequently rebooted, the flashloader 215, which is stored in the electronic processor 100 during the provisioning process, is no longer present. However, the bootloader 220 (as well as other software applications) can be executed after the electronic processor 100 is subsequently rebooted. Thus, an external host device can perform the authentication methods described herein, as well as other authentication methods, by communicating with bootloader 220 (as well as other software applications running on the electronic processor 100).

Using the embodiments described herein, an original equipment manufacturer can, among other things, ensure that the chip manufacturer fuses the correct super root key hash 130 into the electronic processor 100. For example, if the chip manufacturer fuses an incorrect super root key hash 130, the electronic processing unit 105 cannot derive the correct provisioning key needed to decrypt the encrypted bootloader 240, the encrypted common encryption key 250, and the encrypted provisioned key bundle 255.

In addition, the embodiments described herein help ensure that neither the chip manufacturer, nor the product manufacturer can obtain the unencrypted provisioned key bundle (that is, the provisioned key bundle 230). For example, the chip manufacturer may be able to obtain the double encrypted provisioned key bundle 260, but cannot decrypt it because the chip manufacturer does not have the common encryption key 225. As a further example, the product manufacturer cannot decrypt the encrypted provisioned key bundle 255 because the product manufacturer does not have access to the provisioning key 135.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for provisioning a device certificate for an electronic processor, the method comprising:
   receiving a flashloader at an input/output interface included in the electronic processor;
   validating the flashloader with an electronic processing unit included in the electronic processor; and
   after validating the flashloader the electronic processing unit executing executable instructions included in the flashloader that cause the electronic processing unit to perform operations including:
      receiving an encrypted provisioned key bundle at the input/output interface,
      decrypting the encrypted provisioned key bundle using a provisioning key to create a decrypted provisioned key bundle, and
      executing a provisioning process on the electronic processor using the decrypted provisioned key bundle, wherein executing the provisioning process on the electronic processing including:
         retrieving a first key from the decrypted provisioned key bundle,
         generating an unsigned certificate signing request for an unsigned device certificate,
         signing the unsigned certificate signing request with the first key to create a signed certificate signing request,
         sending the signed certificate signing request to a server from the input/output interface, and
         receiving a signed device certificate from the server at the input/output interface.

2. The method of claim 1, wherein the electronic processor is included in an electronic device, wherein the method further comprises authenticating the electronic processor using the signed device certificate.

3. The method of claim 1, wherein after validating the flashloader, the method further comprising:
   receiving an encrypted bootloader at the input/output interface,
   decrypting the encrypted bootloader with the electronic processing unit using the provisioning key to create a decrypted bootloader, and
   storing the decrypted bootloader in a reprogrammable memory included in the electronic processor.

4. The method of claim 1, wherein after validating the flashloader, the method further comprising:
   receiving an encrypted common encryption key at the input/output interface,
   decrypting the encrypted common encryption key with the electronic processing unit using the provisioning key to create a decrypted common encryption key, and
   storing the decrypted common encryption key in a one-time programmable memory included in the electronic processor.

5. The method of claim 4, wherein after validating the flashloader, the method further comprising:
   receiving an encrypted bootloader at the input/output interface,
   decrypting the encrypted bootloader with the electronic processing unit to create a decrypted bootloader, wherein the electronic processing unit decrypts the encrypted bootloader using at least one selected from a group consisting of the provisioning key and the decrypted common encryption key stored in the one-time programmable memory, and
   storing the decrypted bootloader in a reprogrammable memory included in the electronic processor.

6. The method of claim 1, wherein the decrypted provisioned key bundle is a first decrypted provisioned key bundle, wherein the provisioning process is a factory provisioning process, wherein the signed device certificate is a first signed device certificate, and wherein the method further comprising:
   receiving an encrypted common encryption key at the input/output interface,
   decrypting the encrypted common encryption key with the electronic processing unit using the provisioning key to create a decrypted common encryption key,
   storing the decrypted common encryption key in a one-time programmable memory included in the electronic processor,
   receiving a double encrypted provisioned key bundle at the input/output interface,
   retrieving the decrypted common encryption key stored in the one-time programmable memory,
   decrypting the double encrypted provisioned key bundle with the electronic processing unit using the provisioning key and the decrypted common encryption key to create a second decrypted provisioned key bundle, and
   executing a field provisioning process on the electronic processor using the second decrypted provisioned key bundle, wherein executing the provisioning process on the electronic processing includes creating or obtaining a second signed device certificate using the second decrypted provisioned key bundle.

7. A method for provisioning a device certificate for an electronic processor, the method comprising:
   receiving a flashloader at an input/output interface included in the electronic processor;
   validating the flashloader with an electronic processing unit included in the electronic processor; and
   after validating the flashloader the electronic processing unit executing executable instructions included in the flashloader that cause the electronic processing unit to perform operations including
receiving a double encrypted provisioned key bundle at the input/output interface,
retrieving a common encryption key stored in a one-time programmable memory included in the electronic processor,
decrypting the double encrypted provisioned key bundle using the common encryption key and a provisioning key to create a decrypted provisioned key bundle, and
retrieving a first key from the decrypted provisioned key bundle,
generating an unsigned certificate signing request for an unsigned device certificate,
signing the unsigned certificate signing request with the first key to create a signed certificate signing request,
sending the signed certificate signing request to a server from the input/output interface, and
receiving a signed device certificate from the server at the input/output interface.

8. The method of claim 7, wherein the electronic processor is included in an electronic device, where the method further comprises authenticating the electronic processor using the signed device certificate.

9. The method of claim 7, wherein after validating the flashloader, the method further comprising:
receiving an encrypted bootloader at the input/output interface,
decrypting the encrypted bootloader with the electronic processing unit using the common encryption key to create a decrypted bootloader, and
storing the decrypted bootloader in a reprogrammable memory included in the electronic processor.

10. The method of claim 7, wherein after validating the flashloader, the method further comprising
receiving a double encrypted bootloader at the input/output interface,
decrypting the double encrypted bootloader with the electronic processing unit-using the common encryption key and the provisioning key to create a decrypted bootloader, and
storing the decrypted bootloader in a reprogrammable memory included in the electronic processor.

11. A method for provisioning a device certificate for an electronic processor, the method comprising:
receiving a flashloader at an input/output interface included in the electronic processor;
validating the flashloader with an electronic processing unit included in the electronic processor;
after validating the flashloader the electronic processing unit executing executable instructions included in the flashloader that cause the electronic processing unit to perform operations including:
receiving an encrypted provisioned key bundle at the input/output interface,
retrieving a common encryption key stored in a one-time programmable memory included in the electronic processor,
decrypting the encrypted provisioned key bundle using the common encryption key to create a decrypted provisioned key bundle,
retrieving a first key from the decrypted provisioned key bundle,
generating an unsigned certificate signing request for an unsigned device certificate,
signing the unsigned certificate signing request with the first key to create a signed certificate signing request,
sending the signed certificate signing request to a server from the input/output interface, and
receiving a signed device certificate from the server at the input/output interface.

12. The method of claim 11, wherein after validating the flashloader, the method further comprising:
receiving an encrypted bootloader at the input/output interface,
decrypting the encrypted bootloader with the electronic processing unit using the common encryption key to create a decrypted bootloader, and
storing the decrypted bootloader in a reprogrammable memory included in the electronic processor.

* * * * *